United States Patent
Law et al.

(10) Patent No.: US 9,448,642 B2
(45) Date of Patent: Sep. 20, 2016

(54) SYSTEMS AND METHODS FOR RENDERING KEYBOARD LAYOUTS FOR A TOUCH SCREEN DISPLAY

(71) Applicants: Boon Kiat Law, Singapore (SG); Seen Yee Cindy Cheong, Singapore (SG)

(72) Inventors: Boon Kiat Law, Singapore (SG); Seen Yee Cindy Cheong, Singapore (SG)

(73) Assignee: Dell Products LP, Round Rock, TX (US)

( * ) Notice: Subject to any disclaimer, the term of this patent is extended or adjusted under 35 U.S.C. 154(b) by 382 days.

(21) Appl. No.: 13/761,437

(22) Filed: Feb. 7, 2013

(65) Prior Publication Data
US 2014/0218298 A1    Aug. 7, 2014

(51) Int. Cl.
*G06F 3/02*     (2006.01)
*G06F 3/0488*   (2013.01)
*G06F 3/023*    (2006.01)

(52) U.S. Cl.
CPC .......... *G06F 3/0216* (2013.01); *G06F 3/0233* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 6,028,271 A * | 2/2000 | Gillespie | ............. | G06F 3/03547 178/18.01 |
| 8,217,892 B2 | 7/2012 | Meadors | | |
| 2004/0183783 A1 | 9/2004 | Rojas et al. | | |
| 2005/0122313 A1* | 6/2005 | Ashby | .................... | G06F 3/0219 345/168 |
| 2005/0162402 A1* | 7/2005 | Watanachote | ...... | G06F 3/03547 345/173 |
| 2005/0225538 A1* | 10/2005 | Verhaegh | ............ | G06F 3/04886 345/173 |
| 2006/0161871 A1 | 7/2006 | Hotelling et al. | | |
| 2008/0168403 A1* | 7/2008 | Westerman | ......... | G06F 3/04883 715/863 |
| 2009/0237361 A1* | 9/2009 | Mosby | ................ | G06F 3/04883 345/173 |
| 2010/0231541 A1 | 9/2010 | Cruz-Hernandez et al. | | |
| 2010/0277429 A1 | 11/2010 | Day et al. | | |
| 2011/0095877 A1 | 4/2011 | Casparian et al. | | |
| 2011/0102326 A1 | 5/2011 | Casparian et al. | | |
| 2011/0157090 A1 | 6/2011 | Parihar et al. | | |
| 2012/0113008 A1 | 5/2012 | Makinen et al. | | |
| 2012/0169776 A1* | 7/2012 | Rissa | ................... | G06F 3/04883 345/676 |
| 2012/0188174 A1* | 7/2012 | Migos | ................. | G06F 3/04883 345/173 |
| 2013/0057475 A1* | 3/2013 | Duggan | .............. | G06F 3/04886 345/168 |
| 2013/0088439 A1* | 4/2013 | Shih | ........................ | G06F 3/016 345/173 |
| 2014/0006994 A1* | 1/2014 | Koch | .................... | G06F 1/1626 715/773 |
| 2014/0068492 A1* | 3/2014 | Yu | ........................ | G06F 3/04886 715/773 |

OTHER PUBLICATIONS

Faraj et al., "BigKey: A Virtual Keyboard for Mobile Devices", Human-Computer Interaction, Part III, HCII, 2009, 8 pgs.
Tyrsina, Mobile Magazine, "IBM Patents a Virtual Keyboard That Matches Finger Anatomy", Jul. 26, 2011, 4 pgs.

* cited by examiner

*Primary Examiner* — Ryan A Lubit
(74) *Attorney, Agent, or Firm* — Egan, Peterman, Enders & Huston LLP (57) ABSTRACT

Systems and methods are disclosed for rendering soft keyboard layouts for a touchscreen display that are based on the unique finger characteristics of different individual users by taking into account and accommodating unique hand characteristics of different individual users and/or different user preferences for positioning of the user's two hands on the touch screen. The disclosed systems and methods may be implemented in one example to render a custom soft keyboard layout for a user on a touch screen display having a touch display area that is larger than a standard keyboard layout.

26 Claims, 7 Drawing Sheets

SYSTEMS AND METHODS FOR RENDERING KEYBOARD LAYOUTS FOR A TOUCH SCREEN DISPLAY

FIELD OF THE INVENTION

This application relates to touch screen displays and, more particularly, to rendering keyboard layouts for touch screen displays.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Soft keyboards (or onscreen keyboard) designs are currently employed for input to mobile and tablet devices that typically have a screen size of less than 14 inches. Soft keyboard designs for such devices are typically implemented in a manner that maximizes the keyboard usability for the size of such displays, although the maximum size of such displayed keyboards is limited by the available screen real estate. Software keyboards may be implemented as part of the operating system (OS) of an information handling system or as a standalone application. Microsoft Windows 8 virtual keyboard is an example software keyboard that allows a user to select one of a predefined small, medium, or large keyboard size option to resize the displayed keyboard.

Large screen touch displays (such as a Dell ST2220T 21.5 inch diagonal multi-touch display) exist that are configured for interconnection as external monitors for information handling systems such as desktop computers.

SUMMARY OF THE INVENTION

Systems and methods are disclosed herein for rendering keyboard layout for a touch screen display that may be implemented to deliver optimal soft keyboard experience for an individual user on a touch screen display, such as an LCD monitor. In one exemplary embodiment, the disclosed systems and methods may be so implemented (e.g., by using auto-adaptation of the user interface) to the unique finger characteristics of different individual users by taking into account and accommodating unique hand characteristics (e.g., hand size, finger length, finger spacing, etc.) of different individual users and/or different user preferences for positioning of the user's two hands on the touch screen. The disclosed systems and methods may also be implemented in a manner that is not constrained to mimicking or otherwise replicating a standard hard keyboard, and in one exemplary embodiment may be employed to dynamically change the size of individual keys together with the entire keyboard size, without changing the size of each individual key relative to other keys of the rendered keyboard. Moreover the disclosed systems and methods may be advantageously implemented in one embodiment to render a custom soft keyboard layout for a user on a touch screen display having a touch display area that is larger than a standard keyboard layout. In one exemplary embodiment, the disclosed systems and methods may be implemented to render a keyboard layout (keyboard type and keyboard size/key spacing's) for a touch screen display before the keyboard is activated for accepting key input from the fingers of a user. In one exemplary embodiment, the disclosed systems and methods may be implemented to render a keyboard layout (keyboard type and keyboard size/key spacing's) for a touch screen display based on user finger characteristics without requiring a calibration routine.

Thus, in one exemplary embodiment, the disclosed systems and methods may be implemented to automatically size and render an appropriately sized touch screen keyboard layout that is tailored to a user's hand and finger placement when a user places his or her hands and/or fingers on the touch screen in a desired data entry position, and without requiring the user to remove or even move his or her hands and/or fingers from their initial position on the touch screen before beginning data entry. The disclosed systems and methods may be so implemented to render a keyboard layout without using a separate calibration routine that must be first initiated and then requires a user to perform an explicit set of separate calibration exercises repetitively for the purpose of collecting calibration data prior to using the keyboard for data input. And, in one further exemplary embodiment, no calibration instructions to the user are required. Instead, the disclosed systems and methods may be implemented, for example, to account for user preferences and/or hand characteristics (e.g., hand size, spacing between hands, etc.) by collecting information regarding a given user's keyboard layout preferences and/or hand characteristics as part of (or simultaneously with) the normal process of the user's placement of hands and/or fingers on the touch screen to begin using the touch screen keyboard to input data, and advantageously without implementing an explicit set of calibration exercises that must be performed and then completed first before the keyboard may be used for data input. In this regard, the disclosed systems and methods may be implemented in one exemplary embodiment to render a touch screen keyboard layout as part of the same seamless operation in which a user first places his or her hands and/or fingers to the touch screen for data entry, and without requiring the user to again remove his or her hands and/or fingers from the touch screen before entering data. This is in contrast to a calibration routine in which the user is only allowed to start the process of using the keyboard for the purpose of inputting data after a separate calibration data collection routine process is initiated, performed, and then satisfactorily completed.

Using the disclosed systems and methods, a different number (more or less keys) than a standard QWERTY or other type of standard computer keyboard may also be selected for display, and/or different soft keyboard layout styles (e.g., unitary or separate "Thumbs" display) may be selected based on placement of a given user's hands on the touch screen. For example, a software keyboard may be configured by default to display mainly letters of the alphabet, whereas additional special characters (e.g., such as !, @, #, $ and similar additional characters) may only be displayed with a change of keyboard mode. Using the disclosed systems and methods, a user's hand placement may be sensed to determine whether there is additional screen real estate to allow additional special characters to be displayed concurrently with letters of the alphabet. Optional touch screen feedback (e.g., haptic motion and/or visual display indication, audio indication, etc.) may also be employed to interact with a given user during selection of the size and/or layout style of a soft keyboard to be displayed on the touch screen for the given user.

In one respect, disclosed herein is an information handling system, including: a touch screen display device; at least one processing device coupled to provide display data for controlling display of visual images on the touch screen display device, the processing device also being coupled for receiving data signals representative of touched areas of the touch screen display device. The at least one processing device may be configured to alternatively render at least two different soft keyboard layouts on the touch screen display, the two different soft keyboard layouts including: a single unitary soft keyboard for accepting keyboard input from each of a left hand and a right hand of a given user, and a segmented non-unitary soft keyboard having separated different portions with no keyboard portion therebetween, a first one of the separate different portions for accepting input from fingers of a left hand of a user and a second different one of the separate different portions for accepting input from fingers of a right hand of a given user. The at least one processing device may be further configured to determine which of the at least two soft keyboard layouts to render on the touch screen display device based on a measured distance between a first location on the touch screen touched by at least one finger of a user's left hand and a second location on the touch screen touched by at least one finger of a user's right hand, and to render this determined soft keyboard layout on the touch screen display device.

In another respect, disclosed herein is a method of rendering a soft keyboard on a touch screen display device, the method including using at least one processing device to provide display data for controlling display of visual images on the touch screen display device and to receive data signals representative of touched areas of the touch screen display device so as to alternatively render at least two different soft keyboard layouts on the touch screen display. The two different soft keyboard layouts may include: a single unitary soft keyboard for accepting keyboard input from each of a left hand and a right hand of a given user, and a segmented non-unitary soft keyboard having separated different portions with no keyboard portion therebetween, a first one of the separate different portions for accepting input from fingers of a left hand of a user and a second different one of the separate different portions for accepting input from fingers of a right hand of a given user. The method may further include using the at least one processing device to: measure a distance between a first location on the touch screen touched by at least one finger of a user's left hand and a second location on the touch screen touched by at least one finger of a user's right hand, determine which of the at least two soft keyboard layouts to render on the touch screen display device based on based on the measured distance between the first location on the touch screen touched by at least one finger of the user's left hand and the second location on the touch screen touched by at least one finger of the user's right hand, and render the determined soft keyboard layout on the touch screen display device.

DESCRIPTION OF ILLUSTRATIVE EMBODIMENTS

Figure 1:
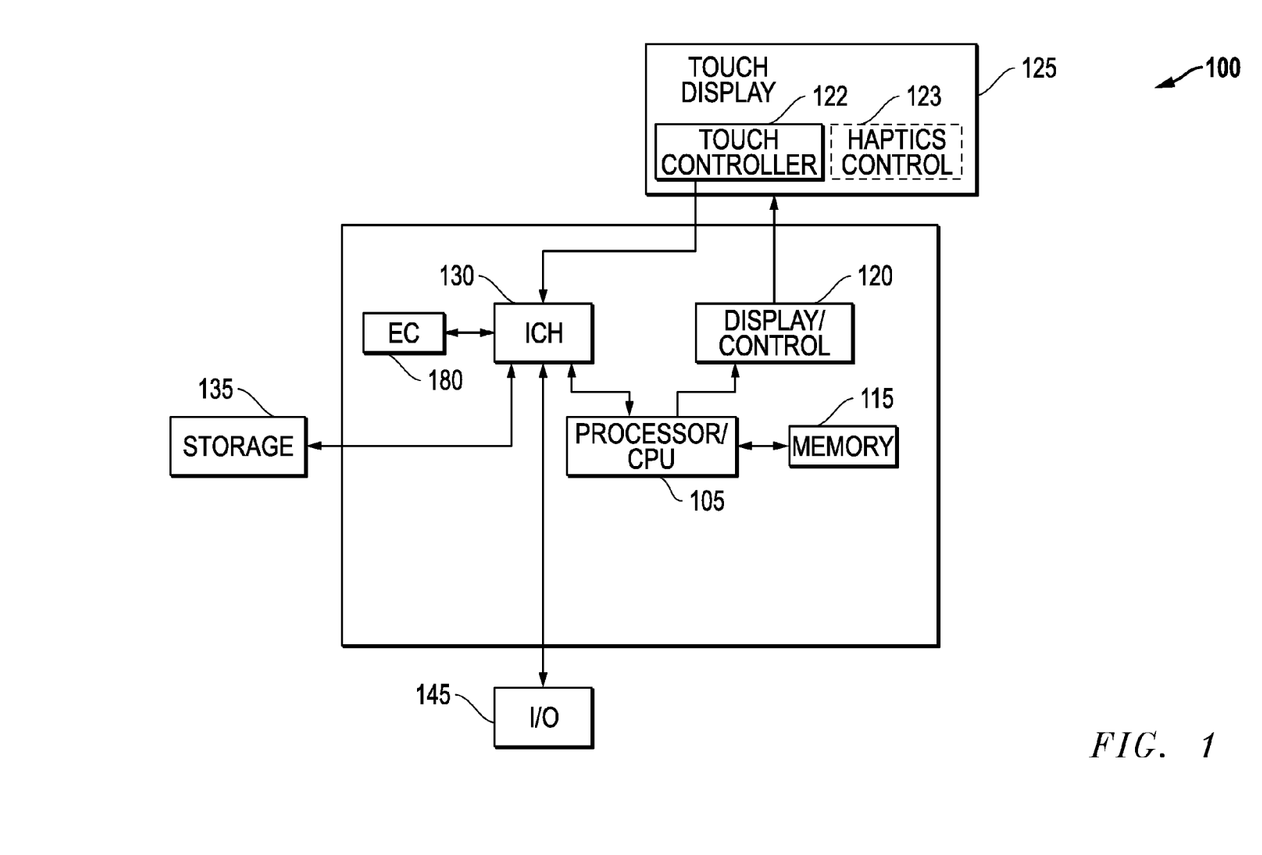
FIG. 1 illustrates a block diagram of an information handling system according to one exemplary embodiment of the disclosed systems and methods.

FIG. 1 is a block diagram of an information handling system 100 as it may be configured in one exemplary embodiment for implementing the disclosed systems and methods. In this embodiment, information handling system 100 may be, for example, a desktop computer, server, or a portable information handling system such as a notebook computer. As shown in FIG. 1, information handling system 100 of this exemplary embodiment includes a host processor (e.g., CPU) 105 such as an Intel Pentium series processor, an Advanced Micro Devices (AMD) processor, or one of many other available processing devices. In this embodiment, processor 105 may include an integrated memory controller (e.g., IMC) and may be coupled as shown to system memory (e.g., DRAM) 115. As further shown, a display controller 120 may be coupled to processor 105 for providing display data to control display of visual images (including a soft keyboard according to the disclosed systems and methods) to a user on external touch screen display device 125 (e.g., LCD display or other suitable display device). An I/O controller hub (ICH) chip 130 may be coupled as shown to processor 105 to facilitate input/output functions for the information handling system. In this regard, local system storage 135 (e.g., one or media drives such as hard disk drive/s, optical drives, etc.) may be coupled to ICH chip 130 to provide permanent system storage for the information handling system 100. An embedded controller (EC) 180 running system BIOS may also be coupled to ICH chip 130. Optional input devices 145 (e.g., such as mouse and/or touchpad) may also be coupled to ICH chip 130 as shown to enable the user to interact with the processor 105 and other components of the information handling system 100.

Still referring to FIG. 1, touch screen display device 125 may be provided with any suitable touch sense system (e.g., capacitive layers, resistive layers technology, surface acoustic wave transducers, etc.) to dynamically sense the specific location/s where a user touches the screen at any given time.

In the illustrated embodiment of FIG. 1, touch screen display device 125 also includes a touch controller 122 that receives signals from the touch sense system of the display 125, and in turn communicates a data signal representative of the sensed touch location/s to processor 105 via ICH chip 130, e.g., via a digital data communication bus such as USB, other suitable wired data path, or alternatively via a wireless data path such Bluetooth or near field data communication. As further shown in FIG. 1, touch screen display device 125 may also be optionally provided with a haptics controller 123 that controls optional haptics circuitry that may impart haptics (or tactile) motion to the touch area of the touch screen display device 125 under conditions that will be described further herein. Examples of haptics technology may be found described in U.S. Pat. No. 8,217,892; United States Patent Application Publication 2011/0102326; and United States Patent Application Publication 2011/0095877, each of which is incorporated herein by reference in its entirety.

Figure 2:
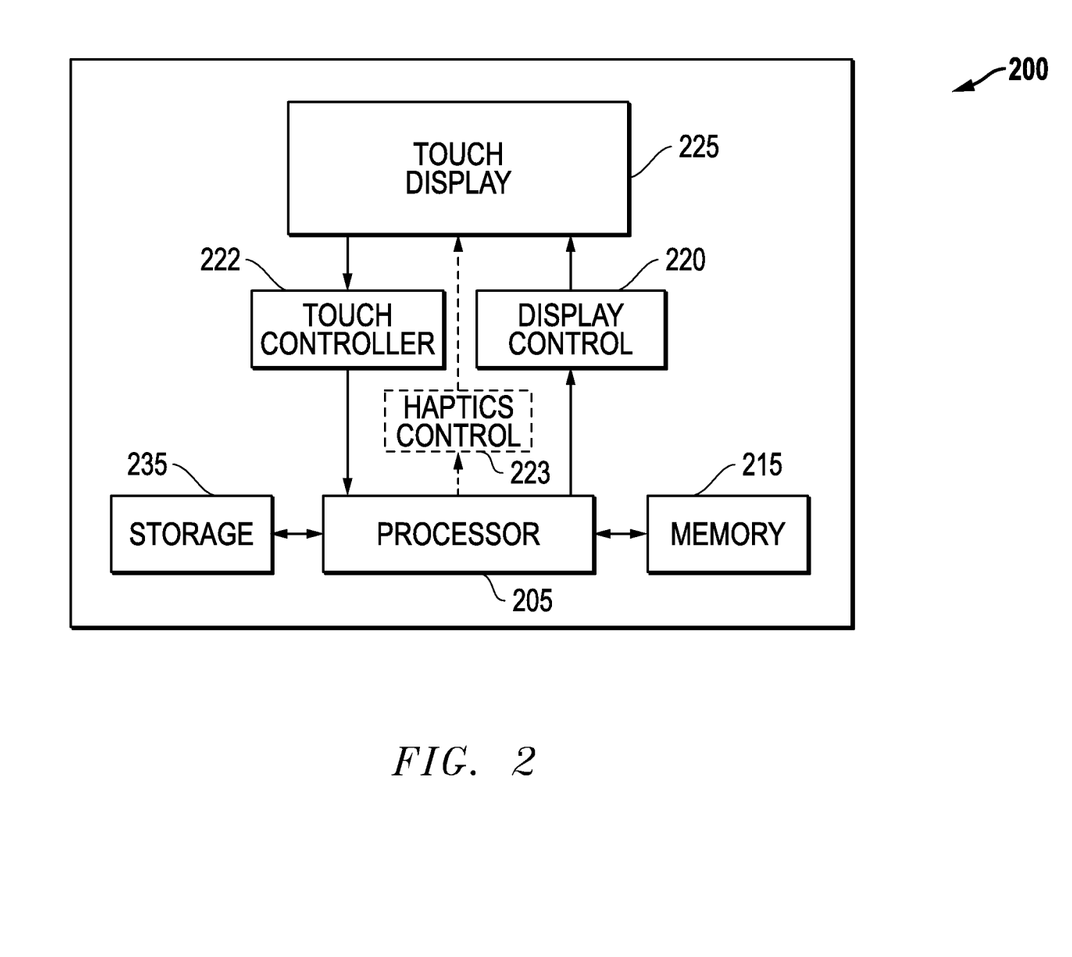
FIG. 2 illustrates a block diagram of an information handling system according to one exemplary embodiment of the disclosed systems and methods.

FIG. 2 is a block diagram of an information handling system 200 as it may be configured in another exemplary embodiment for implementing the disclosed systems and methods, e.g., as a tablet computer. As shown in FIG. 2, information handling system 200 of this exemplary embodiment includes a host processor (e.g., CPU) 205 such as an Intel Atom processor or one of many other available processing devices. As further shown, a display controller 220 may be coupled to processor 205 for controlling display of visual images (including a soft keyboard according to the disclosed systems and methods) to a user on integrated touch screen display device 225 (e.g., LCD display or other suitable display device). System memory 215 (e.g., random access memory "RAM") may be coupled to processor 205, and integrated local system storage 235 (e.g., such as solid state drive, non-volatile memory, hard disk drive, etc.) may be provided as permanent system storage for the information handling system 200. An embedded controller (EC) 180 running system BIOS may also be coupled to ICH chip 130.

Still referring to FIG. 2, touch screen display device 225 may be provided a suitable touch sense system such as previously described in relation to information handling system 200 of FIG. 1. A touch controller 222 may be provided as shown to receive signals from the touch sense system of the touch display 225, and to in turn communicate a data signal representative of the sensed touch location/s to processor 205. An optional integrated haptics controller 223 may be provided to control optional haptics circuitry (e.g., similar to previously described for information handling system 100 of FIG. 1) that itself may impart haptics motion to touch screen display device 225 under conditions that will be described further herein.

FIGS. 1 and 2 illustrate examples of different exemplary embodiments with which the disclosed systems and methods may be implemented, it being understood that the disclosed systems and methods may be similarly implemented with any alternative configuration of information handling system components having a touch screen display with similar display and touch sense capabilities. For example, functions of host processor and controllers of each of respective information handling systems 100 and 200 may alternatively be implemented by a single processing device, or by a greater number of separate processing devices than illustrated. Examples of such processing devices include, but are not limited to processors, microprocessors, controller, microcontrollers, CPUs, ASICs, FPGAs, etc. Further, it will be understood that multiple components, including processing device/s, I/O, memory, storage and display devices may be coupled together in any suitable alternative manner, e.g., using one or more digital data communication buses.

In one exemplary embodiment of the disclosed systems and methods, one or more processing devices (e.g., touch controller 122/222 and CPU 105/205 of FIGS. 1 and 2) of an information handling system may be configured to sense the presence of a user's hands on a touch screen display device and to determine a given keyboard layout and/or keyboard size to be rendered based on the particular placement of the user's hands and/or fingers.

Figure 3:
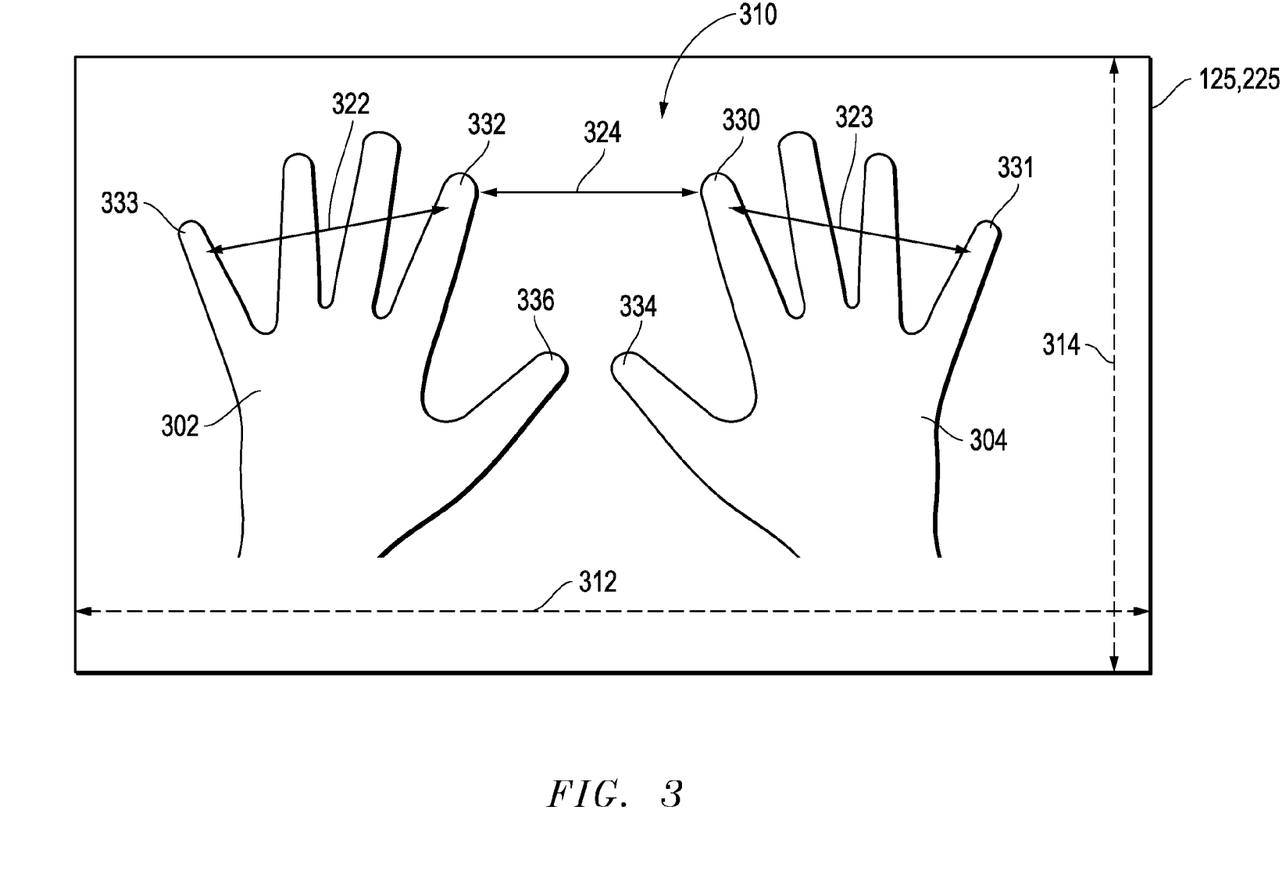
FIG. 3 is a simplified representation of a user's right and left hands placed on a touch screen display according to one exemplary embodiment of the disclosed systems and methods.

For example, FIG. 3 is a simplified representation of a user's right and left hands 302, 304 placed on a touch screen display, such as one of touch screen display devices 125 or 225 of FIG. 1 or 2. In this exemplary embodiment, the display area 310 of touch screen display device 125/225 is greater (e.g., wider and higher) than the width and height of a standard QWERTY keyboard device (wider and higher than a typical standard QWERTY keyboard layout having width of about 11 inches and height of about 4 inches) such that there is sufficient area to render a soft keyboard that has overall outer dimensions (e.g., overall width) that are greater than the overall outer dimensions of a standard full-size QWERTY keyboard, e.g., full size QWERTY keyboard layout having a distance of about 11 inches between left side of the "Caps Lock" key and right side of the "Enter" key or having a distance of about 8 inches between the left side of the "A" key and the right side of the apostrophe key. In this regard, such a soft keyboard may be rendered as either a single unitary soft keyboard or a segmented non-unitary soft keyboard having separated different portions. As an example, in one exemplary embodiment corresponding to a substantially rectangular touch screen display device having a display area of greater than or equal to about 21 diagonal inches, alternatively of greater than about 30 diagonal inches, and further alternatively of from about 21 diagonal inches to about 30 diagonal inches. However it will be understood that the disclosed systems and methods may also be implemented for rendering keyboard on touch screen display devices having a diagonal display area of less than about 21 inches. In one embodiment for touch screen having a display area of about 21.5 diagonal inches, the width 312 of display area 310 may be greater than or equal to about 19 inches, and the height 314 of display area 310 may be greater than or equal to about 10.5 inches. One specific example of such a touch screen is a Dell ST2220T 21.5 inch diagonal multi-touch display available from Dell Products L.P. of Round Rock, Tex.

In the embodiment of FIG. 3, each of the user's right and left hands 302, 304 are shown placed together on touch screen display 125/225 before a soft keyboard is rendered on touch screen display 125/225. In the illustrated embodiment, the user's right and left hands 302, 304 may be placed relatively close together in a conventional typing position so as to indicate that a single unitary soft keyboard is desired. For example, where the user desires that a QWERTY keyboard is to be rendered, the user's index fingers 330 and 332 may be placed to correspond to the user's desired location of the "F" and "J" keys of the QWERTY keyboard, respectively, with the user's thumbs 334 and 336 placed in a position corresponding to the user's desired location of the spacebar. As will be further described herein, the sensed distance between the user's right and left hands 302, 304 may be used in one embodiment to determine the keyboard layout. For example, a distance 324 between a user's two index fingers 330 and 332 may be sensed as shown in FIG. 3, or alternatively a distance between the user's thumbs 334, 336 or between any other corresponding portions of a user's right and left hands 302, 304 may be sensed and then used to determine the rendered keyboard layout. As will also be further described, the sensed distance between at least two portions of a given one of user's right and left hands 302 or 304 may be additionally or alternatively used in one embodiment to determine the keyboard size. For example, as shown in FIG. 3, the sensed distance 322 between the user's left little finger 333 and left index finger 332 (or alternatively the sensed distance between the user's right little finger 331 and right index finger 330) may be used to determine the relative size of the keyboard to be rendered.

Figure 4:
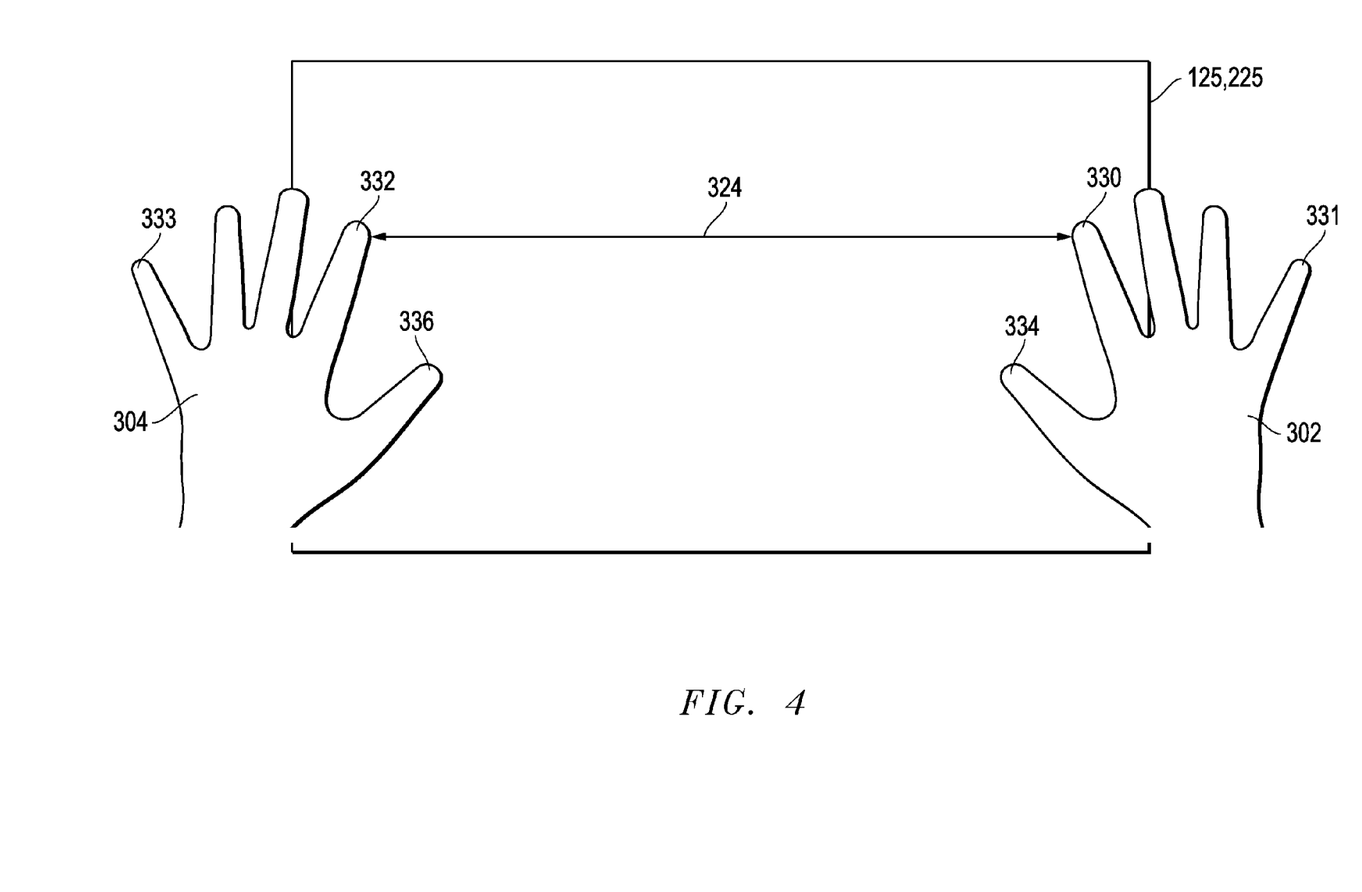
FIG. 4 is a simplified representation of a user's right and left hands placed on a touch screen display according to one exemplary embodiment of the disclosed systems and methods.

FIG. 4 illustrates alternative positioning of user's right and left hands 302, 304 near the opposing edges of touch screen display 125/225 so as to indicate that an alternative keyboard layout in the form of a segmented non-unitary soft keyboard having separated different portions is desired. In this regard, the distance 324 between the user's two index fingers 330 and 332 in FIG. 4 is much greater than the sensed distance 324 in FIG. 3. This larger distance 324 of FIG. 4 may be sensed and used (e.g., by touch controller 122/222 and CPU 105/205) to determine an alternative keyboard layout as will be further described in relation to FIG. 5 herein.

Figure 5:
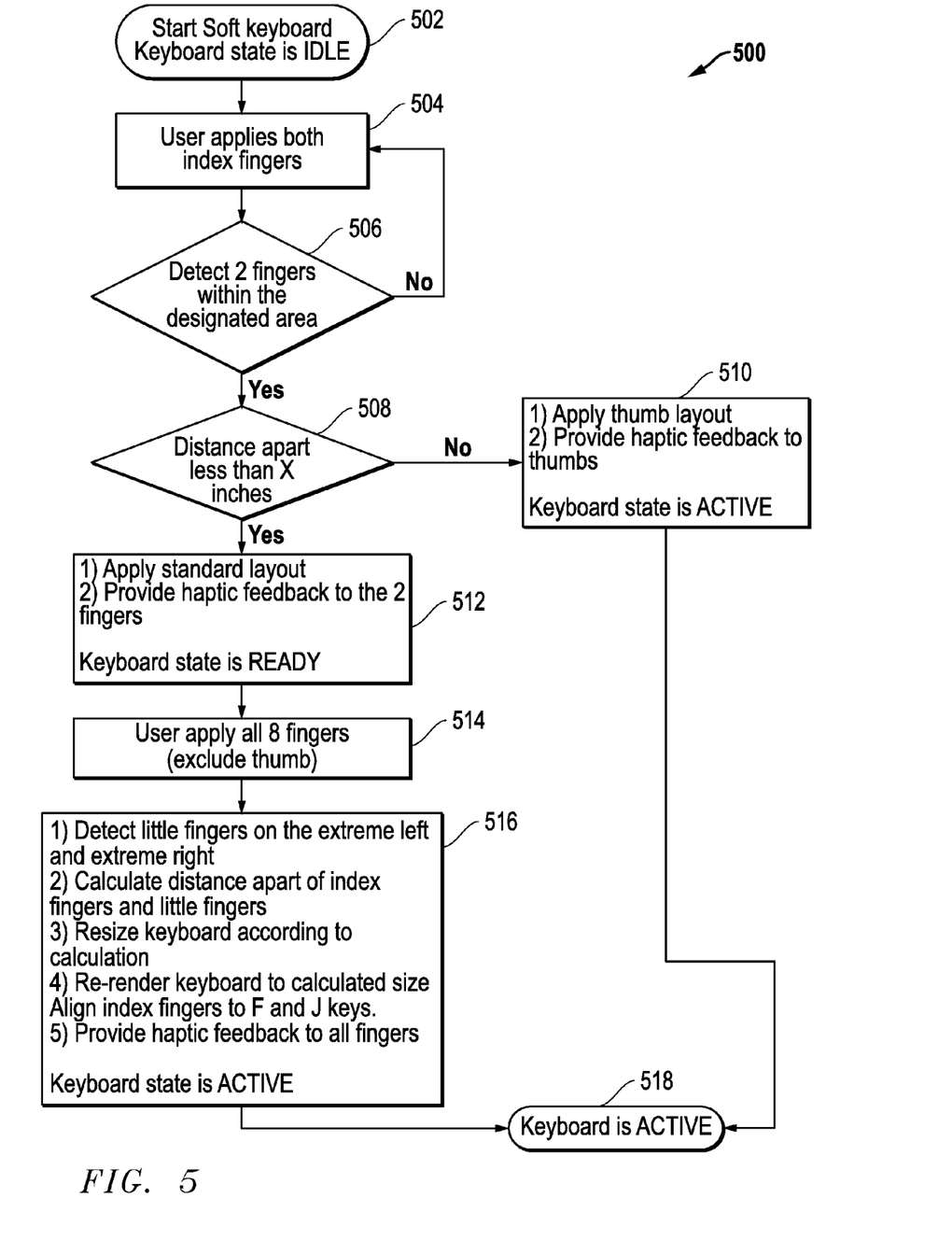
FIG. 5 illustrates methodology according to one exemplary embodiment of the disclosed systems and methods.

FIG. 5 illustrates one exemplary embodiment of a methodology 500 that may be employed to render a soft keyboard on a touch screen display device 125/225 of an information handling system according to the disclosed systems and methods. Methodology 500 may be implemented at least in part by one or more processing devices (e.g., CPU of FIGS. 1 and 2) of an information handling system 100 or 200 such as illustrated in FIG. 1 or FIG. 2 or any other configuration of information handling system having a touch screen display device 125/225 and processing device/s configured to detect location of application of a user's fingers on the touch screen display 125/225.

As shown, methodology 500 begins in step 502 where the touch screen display 125/225 is started with an idle soft keyboard state in which no keyboard is displayed on the touch screen display 125/225, although in one embodiment boundaries of a designated keyboard area may be optionally indicated within which a user is to place the user's fingers in the next step 504. Methodology 500 then proceeds to step 504 where a user places left and right index fingers on the touch screen display 125/225 according to the desired keyboard configuration, e.g., such as illustrated in one of FIG. 3 or FIG. 4. In this regard, a user may be optionally prompted by an instructional message (e.g., visual message displayed on the touch screen display 125/225, audio message played on speakers of the information handling system, haptics motion imparted to the touch screen display, etc.) or a user may alternatively apply left and right index fingers to the touch screen display 125/225 without any instructions to initiate step 506 and 508. In any case, methodology 500 proceeds to step 506 where the touch screen display 125/225 is monitored for the presence and location of the user's right and left index fingers until the fingers are detected.

It will also be understood that the following steps of FIG. 5 may be executed in one exemplary embodiment in a seamless and automatic manner when a user places his or her hands and/or fingers on the touch screen display 125/225 in step 504 for the purpose of data entry, without requiring a separate calibration routine to be initiated and performed first, and without requiring the user to remove his or her hands/fingers from the touch screen or to even change their hand/finger positions on the touch screen before starting the process of data entry. In other words, step 508 may proceed automatically to step 518 upon detection of fingers placed by a user within the desired designated area for data entry without requiring removal or movement of the user's hands and/or fingers. Moreover, no user instructions may be provided in one embodiment. Rather, an appropriately sized keyboard may be automatically sized and rendered when a user places his or her hands and/or fingers on the touch screen in their desired data entry position.

Still referring to FIG. 5, methodology 500 returns to step 504 and repeats until the presence and location of the user's right and left index fingers are detected on the touch screen display 125/225. As will be further explained, a user may use finger positioning on touch screen display 125/225 to select what type of keyboard layout type is desired in step 504 from two or more different available possible keyboard layout types. Once the user's index fingers are detected in step 506, methodology 500 proceeds to step 508 where the distance 324 between the applied user index fingers is determined and compared to a pre-designated value "X" in order to determine the keyboard layout to render. In this regard, "X" may correspond to a pre-designated distance selected to differentiate between two different types of keyboard layouts, e.g., between a single unitary keyboard such as QWERTY, and a segmented non-unitary "Thumbs" style keyboard. For example, the value of X may be selected in one embodiment to be about half the width of the display (e.g., for a 21.5" monitor, X may be selected to be about 9 inches) although it will be understood that any other suitable value may be chosen. As shown, if the distance 324 between the applied index fingers is found in step 508 to be less than the designated distance "X", then a single unitary keyboard selection by the user is indicated and methodology 500 proceeds to steps 512 to 516 for appropriate unitary keyboard rendering as will be further described and illustrated in FIG. 7. However, if the distance 324 between the applied index fingers is determined to be greater than or equal to the value of "X", then a segmented non-unitary keyboard selection by the user is indicated and methodology 500 proceeds to step 510 for appropriate segmented keyboard rendering.

Figure 6:
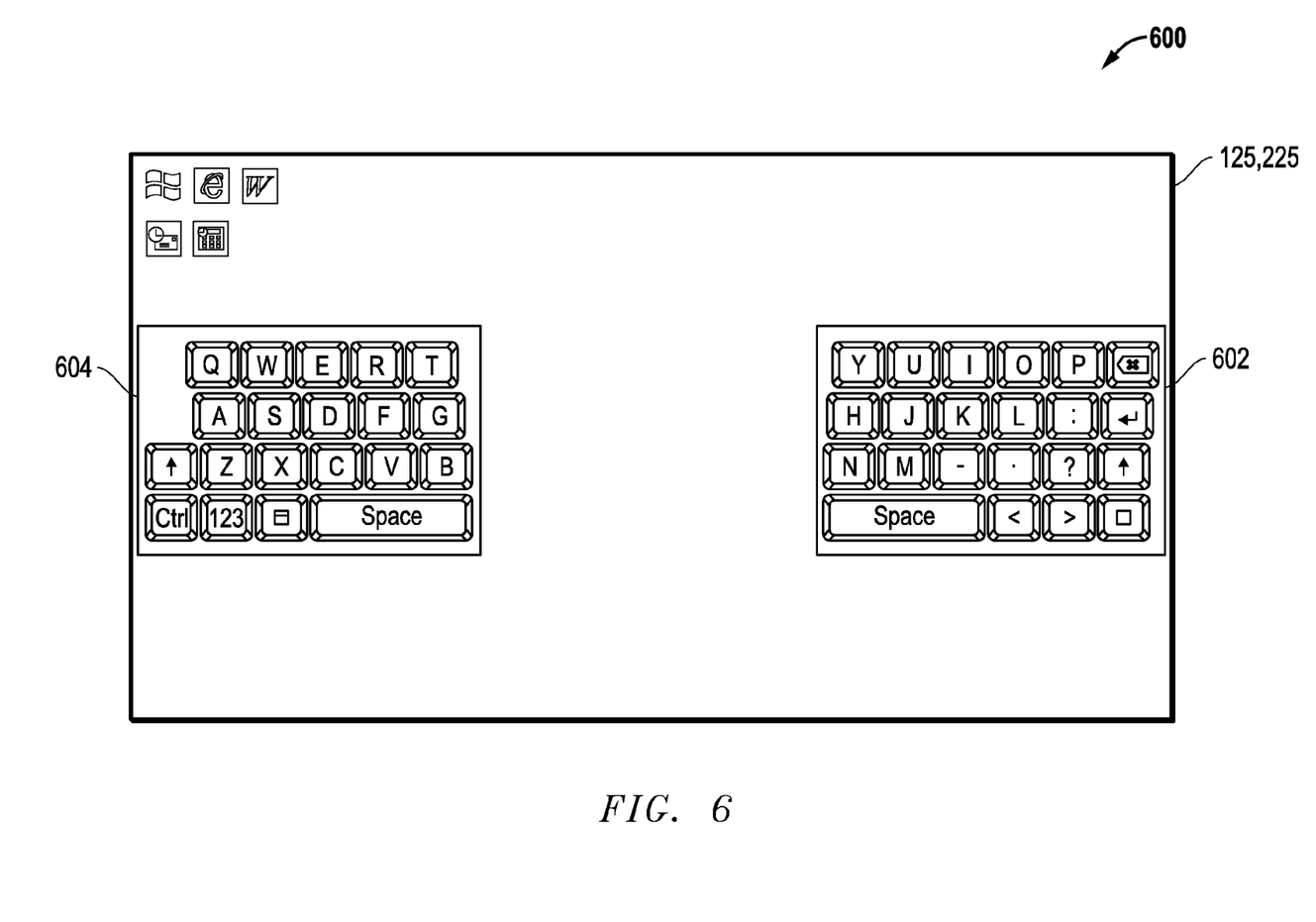
FIG. 6 illustrates a segmented non-unitary keyboard as may be rendered according to one exemplary embodiment of the disclosed systems and methods.

In step 510, a separated thumbs keyboard layout 600 is rendered and activated as illustrated in FIG. 6. As shown in FIG. 6 separate thumbs keyboard layout 600 may include a right keyboard segment 602 and a left keyboard segment 604. Such a thumbs keyboard layout 600 may be rendered according to a predefined fixed size (e.g., predefined height and width), or may alternatively be further resized based on user input. In conjunction with rendering of keyboard 600, haptic motion (and/or visual, audio indication) may also be optionally applied to display 125/225 in step 510 to indicate activation of the keyboard of the user, e.g., to the entire touch screen area, only to those areas of the touch screen display area where the user's thumbs are placed, only to those areas of the touch screen occupied by the rendered keyboard 600, etc.). This haptics motion serves as a prompt to the user that he/she can start typing or otherwise provide key input, without requiring the user to remove his or her fingers from the touch screen. Methodology 500 then terminates in step 518 with the rendered segmented keyboard in an active state and ready to accept key input from the user. Prior to step 510, the keyboard of this exemplary embodiment is not active and does not accept key input from a user, although steps 504-510 proceed automatically to step 518 upon application of the user's hands/fingers to the touch screen in step 504 as a seamless process so that the user may begin to enter data immediately in step 518 without removing his or her fingers from the touch screen 125/225 after first application of his or her fingers to the touch screen in step 504.

Figure 7:
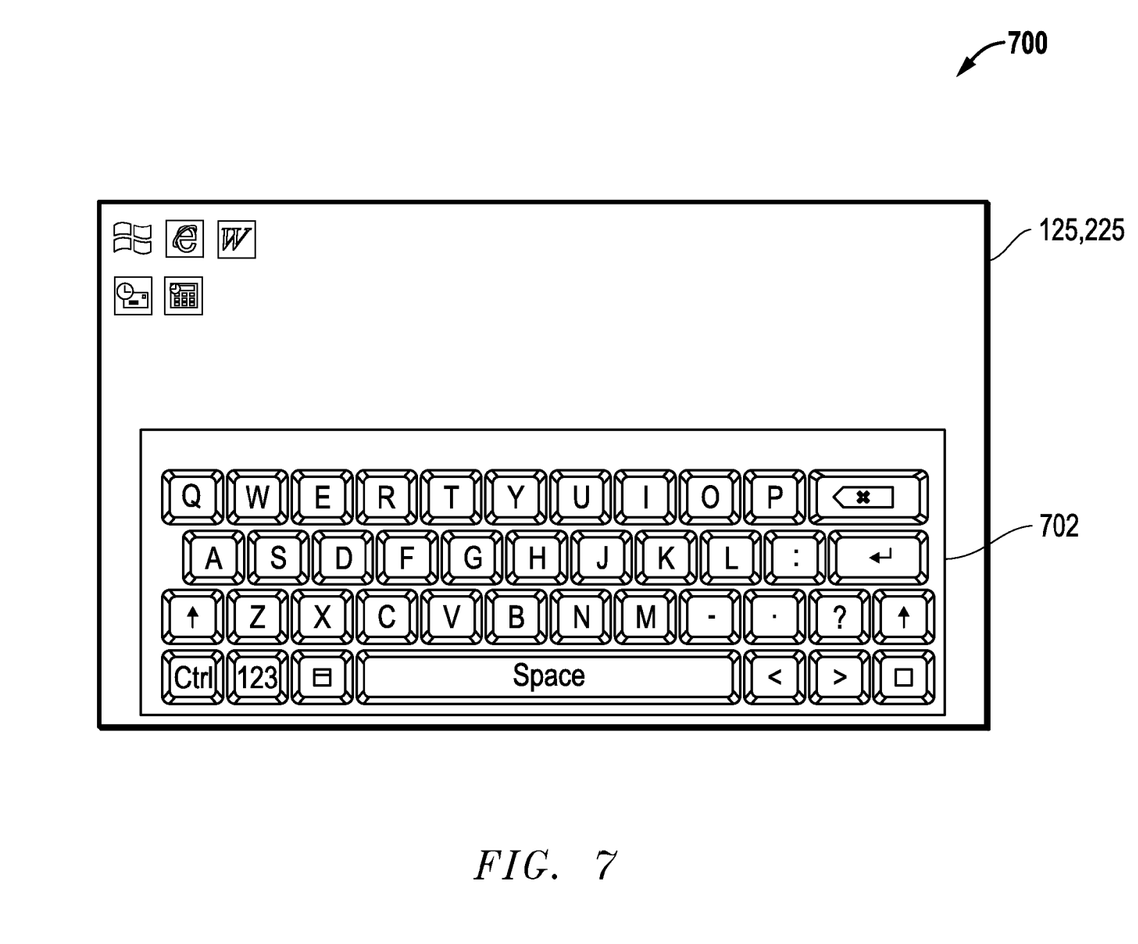
FIG. 7 illustrates a single unitary keyboard as may be rendered according to one exemplary embodiment of the disclosed systems and methods.

Returning to FIG. 5, if the distance 324 between the applied index fingers is found in step 508 to be less than the designated distance "X", then a single unitary keyboard selection by the user is indicated. Methodology 500 then proceeds to step 512 where a standard single unitary keyboard layout 700 having a unitary keyboard segment 702 is rendered as illustrated in FIG. 7, although the keyboard 700 is not yet active in step 512 of this embodiment and therefore does not yet accept key input from a user. Standard single unitary keyboard 700 may also be made ready in step 512 for resizing based on application of multiple fingers of the user's right and left hands to the touch screen display 125/225. Haptic motion (and/or visual, audio indication) may be optionally imparted in step 512 to the touch screen 125/225 (e.g., to the entire touch screen area or alternatively only to the individual areas of the applied index fingers 330 and 332) to indicate that the keyboard 700 has been selected based on finger placement and is ready for resizing. This haptics motion (and/or visual, audio indication) may also prompt the user to apply the remaining six fingers of both hands to the touch screen (e.g., without requiring the user to remove the already-applied index fingers) so that all eight fingers (from left and right hands) are applied to the touch screen 125/225 in a desired typing position over keyboard 700, e.g., in a position such as illustrated in FIG. 3. Methodology 500 then proceeds to step 514 where the user accordingly applies all eight fingers (excluding user's thumbs) in the desired (e.g., natural) typing position over keyboard 700.

Still referring to FIG. 5, upon application of the user's additional fingers in step 514, methodology 500 proceeds to step 516 where the location of each of the right little finger 331 and the left little finger 333 is detected. Then the distance 323 between the right index finger 330 and right little finger 331, and the distance 322 between the left index finger 332 and left little finger 333 are each determined in step 516, although it is possible that only one of distances 322 or 332 may so determined. These determined distance/s 322 and 323 are then used in step 516 to resize the outer dimensions of the rendered keyboard 700. In this regard, the average of the distances 322 and 323 (or either one of distances 322 or 323) may be calculated and used to resize the outer dimensions of the rendered keyboard 700, or in other embodiments the distance between any given two or more fingers on either or both of left and/or right hands 304 and 302 may be alternatively employed for this purpose. In one exemplary embodiment, the height of the rendered keyboard 700 may be fixed and only the width of the rendered keyboard being changed based on the user's finger position.

In one exemplary embodiment, either of determined distances 322 and 323 (or an average of these two determined distance values) may be compared against a pre-designated reference distance value "R" or distance range value "R" to determine whether to resize the outer dimensions of the rendered keyboard 700. For example, a "R" value (e.g., of about 2.5 inches) or range value "R" (e.g., of from 2.25 inches to 2.75 inches) may be chosen to correspond to a default typical keyboard size for rendered keyboard 700. In such an exemplary embodiment, if the determined distance/s 322 and/or 323 is found to be equal to the designated "R" value or within the designated "R" range value, then a keyboard 700 with default reference outer dimension sizes is chosen and rendered. However, if the distance/s 322 and/or 323 are determined to be less than the designated "R" value or "R" range value (e.g., such as for a user with smaller hands having a distance 322 and/or 323 of about 2.0 inches) then the keyboard 700 may be resized correspondingly smaller than the designated reference keyboard size (e.g., reduced by about 20% or resized to a ratio of 2.0/2.5=0.8 that corresponds to how much smaller the determined distance/s 322 and/or 323 are compared to the designated "R" value). Conversely, if the distance/s 322 and/or 323 are determined to be greater than the designated "R" value or "R" range value (e.g., such as for a user with larger hands having a distance 322 and/or 323 of about 3.0 inches) then the keyboard 700 may be resized correspondingly larger than the designated reference keyboard size (e.g., increased by about 20% or resized to a ratio of 3.0/2.5=1.2 that corresponds to how much larger the determined distance/s 322 and/or 323 are compared to the designated "R" value).

However, it will be understood that this is merely one illustrative exemplary embodiment, and that any other methodology and/or designated "R" values may be employed to resize (smaller and/or larger) or otherwise vary dimensions of a rendered keyboard (e.g., such as keyboard 600, keyboard 700, or any other suitable keyboard layout type) based on sensed distance between a user's two hands, between one or more fingers on the different fingers of user, and/or between two or more fingers on the same hand of a user.

Still referring to step 516, the resized keyboard 700 is then rendered (or re-rendered) to the newly calculated size. Thereafter, the type of single unitary keyboard being rendered (e.g., QWERTY, Dvorak keyboard, AZERTY keyboard, etc.) may be aligned in typing position to the user's fingers of the right and left hands 302 and 304. For example, in the case of a rendered QWERTY keyboard, the "J" key of the rendered keyboard may be aligned to the right index finger 330, and the "F" key of the rendered keyboard may be aligned to the left index finger 332 of the rendered keyboard. Further, the ";" key may also be optionally aligned to the right little finger 331 and the "A" key may also be optionally aligned to the left little finger 333, although it is alternatively possible that only the "J" and "F" keys, or that only the ";" and "A" keys may be aligned as described above. In any case this keyboard alignment to user finger position may be accomplished, for example, by using touch controller 122/222 to report the coordinates of 332 and 330 to the CPU 105/205, and subsequently, the CPU 105/205 may calculate the display position based on the size of the rendered keyboard 700 and instruct the display controller 120/220 to display the rendered keyboard. Once the keys have been aligned, the rendered keyboard may be placed in active state for accepting user key input (e.g., data input), and haptic motion (and/or visual, audio indication) may be optionally applied to all fingers to indicate to the user that the keyboard state is now active. Methodology 500 then terminates in step 518 with the rendered single unitary keyboard in an active state and ready to accept key input from the user, and without requiring the user's fingers to be removed from the touch screen. In this regard, steps 504-516 proceed automatically to step 518 upon application of the user's hands/fingers to the touch screen in step 504 as a seamless process so that the user may begin to enter data immediately in step 518 without removing his or her fingers from the touch screen 125/225 after first application of his or her fingers to the touch screen in step 504.

It will be understood that methodology 500 of FIG. 5 is exemplary only, and that any combination of additional, fewer, and/or alternative steps including one or more features disclosed herein may be employed to render a soft keyboard. For example, steps 508 and 510 may be omitted in one embodiment such that methodology always proceeds from step 506 to step 512 to render a single unitary keyboard. Alternatively, either or both of step 510 and/or the sequence of steps 512-516 may be alternatively performed in a manner that renders either a single unitary keyboard or a segmented non-unitary keyboard (as the case may be) that is of a pre-designated size and/or layout, e.g., without resizing the rendered keyboard and/or changing the rendered keyboard size or key spacing based on user finger positioning. In yet another alternative embodiment, positioning of a rendered keyboard on a touch screen display 125/225 may be movable (e.g., after rendering of the keyboard on the touch screen) to different areas of the touch screen based on user's finger positioning and/or movement relative to different areas of the touch screen. Further alternatively, if there are more than two available keyboard layout options, step 508 may be replaced by a corresponding step in which a user interface is displayed on touch display 125/225 that may display multiple possible keyboard options, request the user's input regarding preferred keyboard layout, and/or request other information from the user that may be used as criteria for selecting a particular keyboard layout for rendering. Methodology 500 may then proceed to display a rendered keyboard layout according to the information and/or selections input to the user interface by the user.

It will be understood that one or more of the tasks, functions, or methodologies described herein (e.g., including those described herein for components 105, 120, 122, 123, 180, etc.) may be implemented, for example, as software, firmware or other computer program of instructions embodied in a non-transitory tangible computer readable medium that is executed by a CPU, controller, microcontroller, processor, microprocessor, FPGA, ASIC, or other suitable processing device or combination of such processing devices.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. An information handling system, comprising:
 a touch screen display device;
 at least one processing device coupled to provide display data for controlling display of visual images on the touch screen display device, the processing device also being coupled for receiving data signals representative of touched areas of the touch screen display device;
 where the at least one processing device is configured to alternatively render at least two different soft keyboard layouts on the touch screen display, the two different soft keyboard layouts comprising:
  a single unitary soft keyboard for accepting keyboard input from each of a left hand and a right hand of a given user, and
  a segmented non-unitary soft keyboard having separated different portions with no keyboard portion therebetween, a first one of the separate different portions for accepting input from fingers of a left hand of a user and a second different one of the separate different portions for accepting input from fingers of a right hand of a given user;
 where the at least one processing device is further configured to determine which of the at least two soft keyboard layouts to render on the touch screen display device based on a measured distance between a first location on the touch screen touched by at least one finger of a user's left hand and a second location on the touch screen touched by at least one finger of a user's right hand, and to render this determined soft keyboard layout on the touch screen display device; and
 where the at least one processing device is further configured to compare the measured distance between the first location on the touch screen touched by at least one finger of a user's left hand and the second location on the touch screen touched by at least one finger of a user's right hand to a pre-designated value; and then:
  always render the segmented non-unitary soft keyboard layout on the touch screen display device and never render the single unitary soft keyboard layout on the touch screen display device when the measured distance between the first and second locations is greater than or equal to the pre-designated value, and
  always render the single unitary soft keyboard layout on the touch screen display device and never render the segmented non-unitary soft keyboard layout on the touch screen display device when the measured distance between the first and second locations is less than the pre-designated value;
 where the touch screen display device further comprises haptics circuitry configured to impart haptics motion to the touch area of the touch screen display device; where the at least one processing device is coupled to the haptics circuitry to control the haptics circuitry to impart haptics motion to the touch area of the touch screen display device; and where the at least one processing device is further configured to impart haptics motion to only the first and second locations on the touch screen that were used to determine which of the at least two soft keyboard layouts to render on the touch screen display device only after determining which of the at least two soft keyboard layouts to render on the touch screen display device and prior to accepting key input from a user to indicate that one of the keyboard layouts has been selected;

where the at least one processing device is further configured to:

first detect and respond to application of only an index finger of the user's left hand to the first location on the touch screen and an index finger of the user's right hand to the second location on the touch screen without application of other fingers of the user's left hand and right hand by determining which of the at least two soft keyboard layouts to render on the touch screen display device based on the measured distance between the first location on the touch screen touched by only the index finger of the user's left hand and the second location on the touch screen touched by only the index finger of the user's right hand, and to render this determined soft keyboard layout on the touch screen display device, and then prompt the user to apply the remaining six fingers of the user's left and right hands to the touch screen when the measured distance between the first and second locations is less than the pre-designated value, and then detect and respond to application of the remaining six fingers of the user's left and right hands to the touch screen when the measured distance between the first and second locations is less than the pre-designated value by then resizing the outer dimensions of the rendered single unitary soft keyboard layout on the touch screen display device based on a measured distance between separate locations on the touch screen touched by at least two different fingers on the same left or right hand of a user.

2. The system of claim 1, where the at least one processing device is further configured to control the haptics circuitry to impart haptics motion to the touch area of the touch screen display device to prompt the user to apply the remaining six fingers of the user's left and right hands to the touch screen.

3. The system of claim 1, where the at least one processing device is further configured to control the haptics circuitry to impart haptics motion to the separate locations on the touch screen touched by at least two different fingers on the same left or right hand of the user only after completion of resizing the rendered single unitary soft keyboard layout on the touch screen display device and prior to accepting key input from a user to indicate that the rendered single unitary soft keyboard layout has been resized.

4. The system of claim 1, where the at least one processing device is further configured to control the haptics circuitry to impart haptics motion to only the first and second locations on the touch screen to prompt the user to apply the remaining six fingers of the user's left and right hands to the touch screen.

5. The system of claim 1, where the rendered keyboard layout comprises only the single unitary soft keyboard layout having outer dimensions; and where the at least one processing device is further configured to resize the outer dimensions of the single unitary soft keyboard layout on the touch screen display device based on a measured distance between separate locations on the touch screen touched by the at least two different fingers on the same left or right hand of a user without requiring movement of the at least one finger of the user's left hand from the first location on the touch screen and without requiring movement of the at least one finger of the user's right hand from the second location on the touch screen, and without requiring removal or movement of any of the user's left hand fingers or right hand fingers.

6. The system of claim 1, where the single unitary soft keyboard is a QWERTY keyboard; and where the segmented non-unitary soft keyboard is a "Thumbs" style keyboard.

7. The system of claim 1, where the touch screen display device has a display area of sufficient size to render a soft keyboard that is a QWERTY keyboard having width of about 11 inches and height of about 4 inches.

8. The system of claim 1, where the touch screen display device has a display area of greater or equal to about 21 diagonal inches.

9. The system of claim 5, where the at least one processing device is further configured to:

not accept key input to the touch screen from a user prior to resizing the outer dimensions of the single unitary soft keyboard; and then terminate resizing of the outer dimensions of the single unitary soft keyboard on the touch screen display device after resizing the outer dimensions of the single unitary soft keyboard and prior to accepting key input from a user.

10. The system of claim 5, where the at least one processing device is further configured to resize the single unitary soft keyboard layout on the touch screen display device based on an average of the measured distance between separate locations on the touch screen touched by index and little fingers of the left hand of the user and the measured distance between separate locations on the touch screen touched by index and little fingers of the right hand of the user without requiring movement of the at least one finger of the user's left hand from the first location on the touch screen and without requiring movement of the at least one finger of the user's right hand from the second location on the touch screen, and without requiring removal or movement of any of the user's left hand fingers or right hand fingers.

11. The system of claim 5, where the at least one processing device is further configured to impart haptics motion to the separate locations on the touch screen touched by the at least two different fingers on the same left or right hand of the user only after completion of resizing the rendered single unitary soft keyboard layout on the touch screen display device.

12. The system of claim 5, where the at least one processing device is further configured to:

activate the rendered soft keyboard for user key input after completion of the rendering of the rendered keyboard layout without requiring the removal or movement of the index finger of the user's left hand from the first location on the touch screen or removal or movement of the index finger of the user's right hand from the second location on the touch screen.

13. The system of claim 5, where the first location on the touch screen is an initial position of the index finger of the user's left hand on the touch screen for data entry; where the second location on the touch screen is an initial position of the index finger of the user's right hand on the touch screen for data entry; and where the at least one processing device is further configured to determine which of the at least two soft keyboard layouts to render on the touch screen display device without requiring the user to remove or move any of the fingers of the left hand and right hand from their initial position on the touch screen before beginning data entry.

14. A method of rendering a soft keyboard on a touch screen display device, the method comprising:

using at least one processing device to provide display data for controlling display of visual images on the touch screen display device and to receive data signals representative of touched areas of the touch screen display device so as to alternatively render at least two different soft keyboard layouts on the touch screen display, the two different soft keyboard layouts comprising:
  a single unitary soft keyboard for accepting keyboard input from each of a left hand and a right hand of a given user, and
  a segmented non-unitary soft keyboard having separated different portions with no keyboard portion therebetween, a first one of the separate different portions for accepting input from fingers of a left hand of a user and a second different one of the separate different portions for accepting input from fingers of a right hand of a given user; and
using the at least one processing device to:
  measure a distance between a first location on the touch screen touched by at least one finger of a user's left hand and a second location on the touch screen touched by at least one finger of a user's right hand,
  determine which of the at least two soft keyboard layouts to render on the touch screen display device based on based on the measured distance between the first location on the touch screen touched by at least one finger of the user's left hand and the second location on the touch screen touched by at least one finger of the user's right hand, and
  render the determined soft keyboard layout on the touch screen display device; and
where the method further comprises using the at least one processing device to compare the measured distance between the first location on the touch screen touched by at least one finger of the user's left hand and the second location on the touch screen touched by at least one finger of the user's right hand to a pre-designated value; and then:
  always render the segmented non-unitary soft keyboard layout on the touch screen display device and never render the single unitary soft keyboard layout on the touch screen display device when the measured distance between the first and second locations is greater than or equal to the pre-designated value, and
  always render the single unitary soft keyboard layout on the touch screen display device and never render the segmented non-unitary soft keyboard layout on the touch screen display device when the measured distance between the first and second locations is less than the pre-designated value;
where the method further comprises using the at least one processing device to impart haptics motion to only the first and second locations on the touch screen that were used to determine which of the at least two soft keyboard layouts to render on the touch screen display device only after determining which of the at least two soft keyboard layouts to render on the touch screen display device and prior to accepting key input from a user to indicate that one of the keyboard layouts has been selected; and
where the method further comprises using the at least one processing device to:
  first detect and respond to application of only an index finger of the user's left hand to the first location on the touch screen and an index finger of the user's right hand to the second location on the touch screen without application of other fingers of the user's left hand and right hand by determining which of the at least two soft keyboard layouts to render on the touch screen display device based on the measured distance between the first location on the touch screen touched by only the index finger of the user's left hand and the second location on the touch screen touched by only the index finger of the user's right hand, and to render this determined soft keyboard layout on the touch screen display device, and
  then prompt the user to apply the remaining six fingers of the user's left and right hands to the touch screen when the measured distance between the first and second locations is less than the pre-designated value, and
  then detect and respond to application of the remaining six fingers of the user's left and right hands to the touch screen when the measured distance between the first and second locations is less than the pre-designated value by then resizing the outer dimensions of the rendered single unitary soft keyboard layout on the touch screen display device based on a measured distance between separate locations on the touch screen touched by at least two different fingers on the same left or right hand of a user.

15. The method of claim 14, further comprising using the at least one processing device to impart haptics motion to the touch area of the touch screen display device to prompt the user to apply the remaining six fingers of the user's left and right hands to the touch screen.

16. The method of claim 14, where the at least one processing device is further configured to impart haptics motion to the separate locations on the touch screen touched by at least two different fingers on the same left or right hand of the user only after completion of resizing the rendered single unitary soft keyboard layout on the touch screen display device and prior to accepting key input from a user to indicate that the rendered single unitary soft keyboard layout has been resized.

17. The method of claim 14, further comprising using the at least one processing device to impart haptics motion to only the first and second locations on the touch screen to prompt the user to apply the remaining six fingers of the user's left and right hands to the touch screen.

18. The method of claim 14, where the single unitary soft keyboard is a QWERTY keyboard; and where the segmented non-unitary soft keyboard is a "Thumbs" style keyboard.

19. The method of claim 14, where the touch screen display device has a display area of sufficient size to render a soft keyboard that is a QWERTY keyboard having width of about 11 inches and height of about 4 inches.

20. The method of claim 14, where the touch screen display device has a display area of greater or equal to about 21 diagonal inches.

21. The method of claim 14, further comprising:
  where the rendered keyboard layout comprises only the single unitary soft keyboard layout having outer dimensions; and
  where the method further comprises using the at least one processing device to resize the outer dimensions of the single unitary soft keyboard layout on the touch screen display device based on a measured distance between separate locations on the touch screen touched by the at least two different fingers on the same left or right hand of a user without requiring movement of the at least one finger of the user's left hand from the first location on the touch screen and without requiring movement of the at least one finger of the user's right hand from the second location on the touch screen, and without removal or movement of any of the user's left hand fingers or right hand fingers.

22. The method of claim 21, further comprising using the at least one processing device to resize the single unitary soft keyboard layout on the touch screen display device based on an average of the measured distance between separate locations on the touch screen touched by index and little fingers of the left hand of the user and the measured distance between separate locations on the touch screen touched by index and little fingers of the right hand of the user without requiring movement of the at least one finger of the user's left hand from the first location on the touch screen and without requiring movement of the at least one finger of the user's right hand from the second location on the touch screen, and without removal or movement of any of the user's left hand fingers or right hand fingers.

23. The method of claim 21, further comprising using the at least one processing device to impart haptics motion to the separate locations on the touch screen touched by the at least two different fingers on the same left or right hand of the user only after completion of resizing the rendered single unitary soft keyboard layout on the touch screen display device.

24. The method of claim 21, further comprising using the at least one processing device to:
  automatically determine and render the determined soft keyboard layout on the touch screen display device in response to detection of placement of the at least one finger of a user's left hand at the first location on the touch screen and placement of at least one finger of the user's right hand at the second location on the touch screen; and
  then to activate the rendered soft keyboard for user key input after completion of the rendering of the rendered keyboard layout without requiring the removal or movement of the index finger of the user's left hand from the first location on the touch screen or removal or movement of the index finger of the user's right hand from the second location on the touch screen.

25. The method of claim 21, where the first location on the touch screen is an initial position of the index finger of the user's left hand on the touch screen for data entry; where the second location on the touch screen is an initial position of the index finger of the user's right hand on the touch screen for data entry; and where the method further comprises using the at least one processing device to determine which of the at least two soft keyboard layouts to render on the touch screen display device without requiring the user to remove or move any of the fingers of the left hand and right hand from their initial position on the touch screen before beginning data entry.

26. The method of claim 21, further comprising using the at least one processing device to:
  not accept key input to the touch screen from a user prior to resizing the outer dimensions of the single unitary soft keyboard; and
  then terminate resizing of the outer dimensions of the single unitary soft keyboard on the touch screen display device after resizing the outer dimensions of the single unitary soft keyboard and prior to accepting key input from a user.

\* \* \* \* \*